United States Patent
Schultz

Patent Number: 5,119,000
Date of Patent: Jun. 2, 1992

[54] LOW NOISE MOTOR DRIVE CIRCUIT
[75] Inventor: Warren J. Schultz, Tempe, Ariz.
[73] Assignee: Motorola, Inc., Schaumburg, Ill.
[21] Appl. No.: 660,185
[22] Filed: Feb. 25, 1991
[51] Int. Cl.[5] .............................. H02P 6/00
[52] U.S. Cl. .................... 318/254; 318/293; 363/132
[58] Field of Search ........ 318/254, 138, 437, 807-811, 318/280-286, 293, 494, 498, 519; 388/809, 811, 818; 361/111, 29; 363/17, 22, 24, 26, 31, 39, 41, 45, 132, 136, 58, 98

[56] References Cited
U.S. PATENT DOCUMENTS

| | | | |
|---|---|---|---|
| 3,575,652 | 4/1971 | Snyder | 318/510 |
| 3,739,254 | 6/1973 | Kojima et al. | 363/61 |
| 3,978,393 | 8/1976 | Wisner et al. | 363/19 X |
| 4,118,658 | 10/1978 | Salva et al. | 318/257 |
| 4,520,300 | 5/1985 | Fradella | 318/439 X |
| 4,566,059 | 1/1986 | Gallior et al. | 353/132 X |
| 4,609,859 | 9/1986 | Williams | 318/810 |
| 4,618,810 | 10/1986 | Hagerman | 318/807 X |
| 4,947,309 | 8/1990 | Jonsson | 363/98 X |
| 5,055,990 | 10/1991 | Mini et al. | 363/132 X |

Primary Examiner—A. Jonathan Wysocki
Attorney, Agent, or Firm—Joe E. Barbee

[57] ABSTRACT

A normally non-conducting motor drive transistor is connected in parallel with a freewheeling diode. The transistor is briefly enabled while reverse recovery transition current is flowing in the freewheeling diode and thereby reduces noise created by the diode when it switches from conducting reverse recovery current to blocking reverse voltage.

24 Claims, 4 Drawing Sheets 5,119,000

LOW NOISE MOTOR DRIVE CIRCUIT

BACKGROUND OF THE INVENTION

The present invention relates, in general, to electronic circuits for operating electric motors, and more particularly, to a novel low noise motor drive circuit.

In the past, various forms of electronic circuits had been utilized to drive electric motors. The most efficient motor drive circuits included a pair of power transistors, such as power metal oxide semiconductor field effect transistors (power MOSFETs), that were connected in a stacked configuration between the terminals of a power source for the motor. An output from the stacked transistors was connected to a terminal of the electric motor. Such circuits alternately switched the terminal of the motor between two sides of the power source in order to operate the motor. During the switching of the motor, transient voltages and currents were produced which effected the operation of the transistors and of control circuitry which operated the transistors. Each transistor generally had a freewheeling diode connected in parallel across the transistor to dissipate energy from the motor and to steer the energy back to the power source. As the diode dissipated the energy, it induced noise in the form of perturbations in the current flow from the power source. The noise was coupled to other logic and control circuits which were also connected to the power source, some of which were utilized to sequence switching of the power transistors. The noise often caused improper operation of the logic and control circuits, which often caused improper operation of the motor.

Accordingly, it is desirable to have a low noise motor drive circuit that minimizes the amount of noise induced into the power source.

SUMMARY OF THE INVENTION

Briefly stated, the present invention is achieved by briefly enabling a normally non-conducting motor drive transistor which is connected in parallel with a freewheeling diode. Briefly enabling the transistor while reverse recovery transition current is flowing in the freewheeling diode reduces noise created by the diode when it switches from conducting reverse recovery current to blocking reverse voltage.

DETAILED DESCRIPTION OF THE DRAWINGS

While the invention is described with specific preferred embodiments, it is evident that many alternatives and variations will be apparent to those skilled in the art. More specifically the invention has been described for a particular H-bridge motor drive configuration and with power MOSFET drive transistors, although the method is directly applicable to other motor drive configurations, as well as to other drive transistors.

Figure 1:
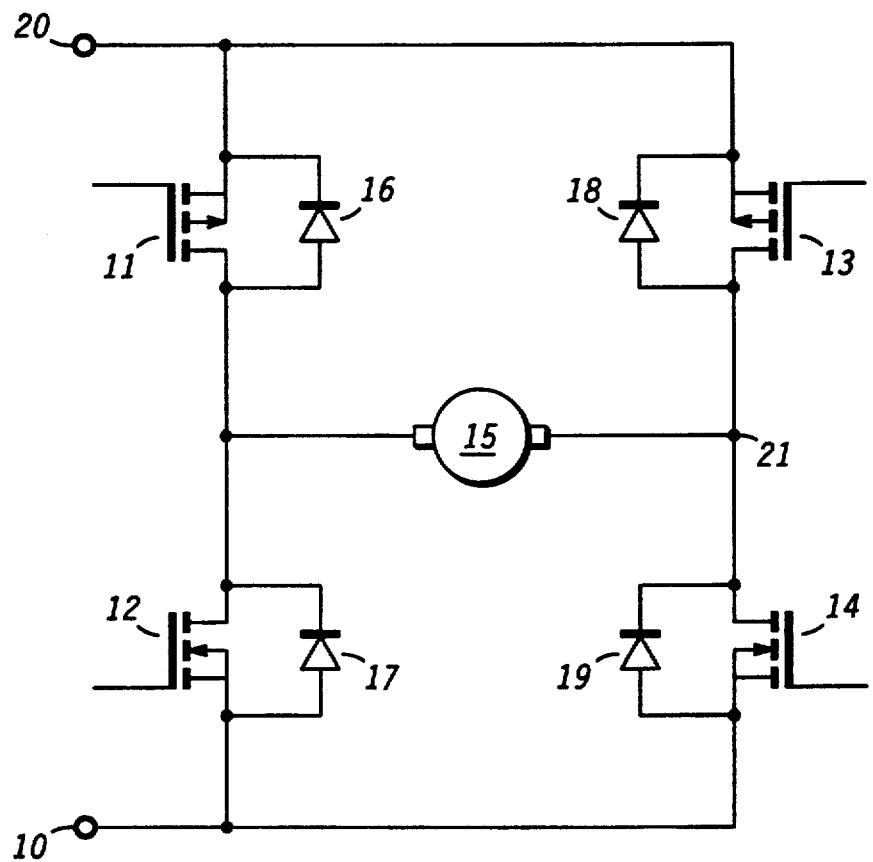
FIG. 1 is an example of a portion of a prior art motor drive circuit.

FIG. 1 illustrates an example of a portion of a prior art motor drive circuit. Four motor drive transistors 11, 12, 13, and 14 are connected in an H-bridge configuration to operate a motor 15. Diodes 16, 17, 18, and 19 are freewheeling diodes and one is connected in parallel across each transistor 11, 12, 13, and 14, respectively. In a conventional motor drive circuit, motor 15 is operated by alternately turning on both transistors 11 and 14, and then both transistors 13 and 12 thereby steering current from a power supply terminal 20 through an upper leg of the H-bridge, through motor 15, and through an opposite lower leg of the H-bridge to a power return terminal 10.

Utilizing a pulse width modulation technique to control the speed of motor 15 is an adaptation of a conventional motor drive. Pulse width modulation is accomplished by rapidly switching the lower leg transistor, 12 or 14, on and off while the corresponding upper leg transistor, 11 or 13, is conducting. As an example, consider the case of transistor 11 conducting, transistors 12 and 13 not conducting, and transistor 14 conducting. In this case, transistor 14 could be pulse width modulated by the application of a high frequency signal that rapidly switches transistor 14 on and off during the time that transistor 11 is conducting. The pulse width modulation frequency would be much higher than the operating frequency of motor 15 and is typically in the range of 2 KHz to 100 KHz. As transistor 14 switches in response to the pulse width modulation signal, noise is induced in power source terminal 20.

Figure 2:
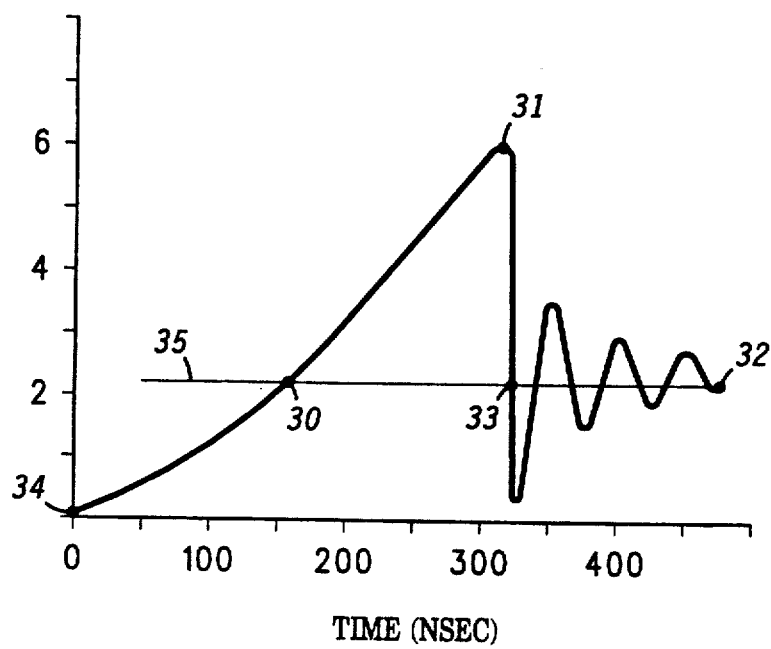
FIG. 2 is a prior art graph of power supply current during a portion of the operation of the prior art circuit of FIG. 1.

FIG. 2 is a prior art graph of current flow at power source terminal 20 for a portion of the operation of the prior art circuit of FIG. 1. The current in amps is shown along the ordinate and time in nanoseconds is shown along the abscissa. As transistor 14 of FIG. 1 begins conducting, the current begins approximately at zero, as shown by point 34, increases to a peak approximately at point 31, decreases rather rapidly, then exhibits damped oscillations, and finally settles to a steady state value at point 32. The large initial undershoot and damped oscillations that begin at point 33, in addition to the large di/dt between points 31 and 33, represent noise that is coupled to all circuits connected to power source terminal 20 of FIG. 1, and is also radiated to all circuits within the proximity of the motor drive circuit shown in FIG. 1.

Referring again to FIG. 1, the noise is primarily produced by the action of diode 18 and diode 16. If transistors 11 and 14 are conducting, current is flowing through motor 15. Transistor 14 is then turned off for a period of time by the pulse width modulation signal. The inductive characteristics of motor 15 force the voltage at a node 21 to increase until diode 18 begins to conduct thereby steering current from motor 15 back to power source terminal 20. Diode 18 continues conducting to steer current from motor 15 to power source terminal 20, and in conducting this current saturates the P-N junction of diode 18. As transistor 14 is once again switched on by the pulse width modulation signal and begins to conduct current through motor 15, current from power source terminal 20 increases and reaches the approximate value that will become the steady state current projected to point 30 by line 35 of FIG. 2. During this time, the inductive characteristics of motor 15 maintains the increased voltage at node 21 thereby maintaining a forward bias on diode 18. As this value of current is reached, transistor 14 is conducting all the motor current, diode 18 is no longer conducting current from motor 15, and the voltage across diode 18 reverses from a forward voltage to zero. Although transistor 14 is now conducting all the current of motor 15, diode 18 is still saturated and has an associated stored charge that must be dissipated. This stored charge is dissipated into power source terminal 20 and is represented in FIG. 2 by the current, referred to as reverse recovery current, from point 30 to point 31. Once the stored charge is dissipated, current from diode 18 abruptly ceases as shown and the corresponding rapid change in current, high di/dt as shown between points 31 and 33 of FIG. 2, creates oscillations in the power source current, as shown between points 33 and 32 of FIG. 2. The current from approximately point 31 to approximately point 33 is referred to as reverse recovery transition current.

It has been found that the reverse recovery transition current of diode 18 can be smoothed and the induced noise reduced by turning on transistor 13 during the time reverse recovery transition current is flowing in diode 18 thereby substantially critically damping the reverse recovery transition current and smoothing the transition to steady state current. The present invention provides a motor drive circuit that substantially critically damps reverse recovery transition current of the circuit's freewheeling diodes and thereby reduces the amount of noise current induced in a power source by the freewheeling diodes.

Figure 3:
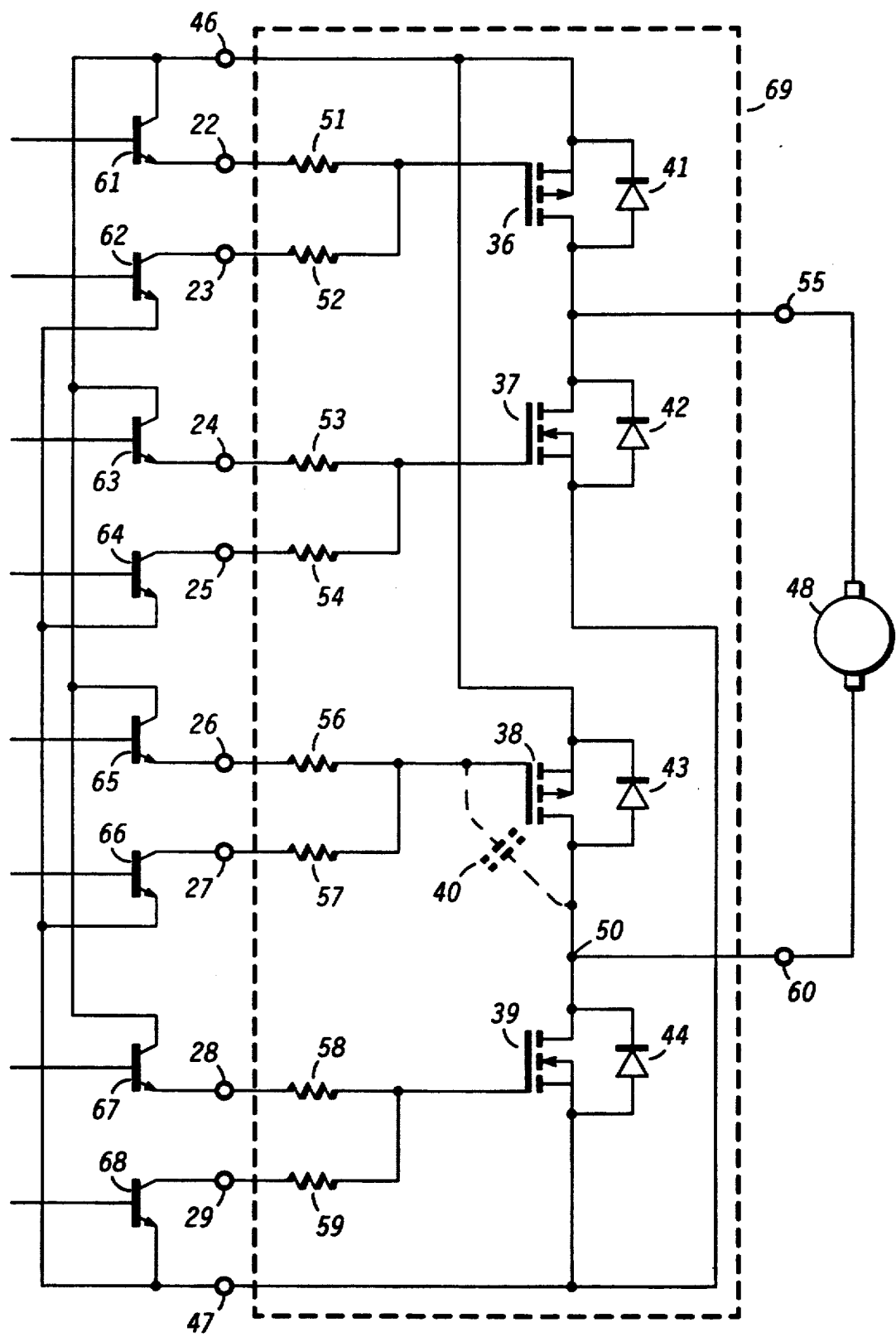
FIG. 3 is an embodiment of a motor drive circuit in accordance with the present invention.

FIG. 3, illustrates an embodiment of a low noise motor drive circuit 69 that includes motor drive transistors 36, 37, 38, and 39 connected in an H-bridge configuration to operate a motor 48.

Transistor 36, in a first leg of the H-bridge, functions as a high side switch that couples motor 48 to a power supply terminal 46. The coupling is facilitated by having the drain electrode of transistor 36 connected to an output terminal 55 of circuit 69 and the source electrode of transistor 36 connected to power supply terminal 46. A freewheeling diode 41 that steers energy from motor 48 to power supply terminal 46 has the anode connected to the drain electrode of transistor 36, and the cathode connected to the source electrode of transistor 36. P-channel transistor 36 is disabled when its gate is coupled to power supply terminal 46 by a means for disabling transistor 36, illustrated as a resistor 51, and an external transistor 61. The first terminal of resistor 51 is connected to the gate electrode of transistor 36 and the second terminal is connected to an input terminal 22 of circuit 69. Since external transistor 61 must apply a voltage to resistor 51, the collector electrode of transistor 61 is connected to power supply terminal 46 and the emitter electrode is connected to input terminal 22. Enabling of external transistor 61 is accomplished via the base electrode which is connected to circuitry (not shown) for controlling motor drive circuit 69. During a portion of the operation of circuit 69, transistor 36 is enabled by a means for enabling transistor 36, illustrated as a resistor 52, and an external transistor 62. External transistor 62 can be enabled via its base electrode which is connected to circuitry (not shown) for controlling motor drive circuit 69. The collector electrode of external transistor 62 is connected to an input terminal 23 of circuit 69 and the emitter electrode is connected to a power supply terminal 47 thereby facilitating the application of a voltage to input terminal 23. Since the first terminal of resistor 52 is connected to input terminal 23 and the second terminal is connected to the gate electrode of transistor 36, a signal applied to input terminal 23 is coupled to the gate of transistor 36 and enables it.

A low side switch in the first leg of the H-bridge includes transistor 37 and is operated in a manner similar to the high side switch. Since the source electrode of transistor 37 is connected to power supply terminal 47 and the drain electrode is connected to output terminal 55, enabling transistor 37 couples motor 48 to power supply terminal 47. A freewheeling diode 42 connected in parallel with transistor 37 directs energy from motor 48 to power supply terminal 47 and bypasses transistor 37. The anode of freewheeling diode 42 is connected to the source electrode of transistor 37 and the cathode is connected to the drain electrode of transistor 37. During a portion of the operation of circuit 69, an enabling gate voltage is applied to N-channel transistor 37 by a means for enabling transistor 37, illustrated as a resistor 53, and an external transistor 63. In order to develop the gate voltage, the collector electrode of external transistor 63 is connected to power supply terminal 46 and the emitter electrode is connected to an input terminal 24 of circuit 69. A base electrode of transistor 63 is connected to circuitry (not shown) for controlling motor drive circuit 69. Since resistor 53 has a first terminal connected to the gate electrode of transistor 37 and a second terminal connected to input terminal 24, voltage applied to input terminal 24 is coupled to the gate of transistor 37 to enable it. Similarly, transistor 37 is disabled by the action of a means for disabling transistor 37, illustrated as a resistor 54, and an external transistor 64. The first terminal of resistor 54 is connected to the gate electrode of transistor 37, and the second terminal is connected to an input terminal 25 of circuit 69. Since the collector electrode of external transistor 64 is connected to input terminal 25 and the emitter electrode is connected to power supply terminal 47, external transistor 64 can couple resistor 54 to power supply terminal 47 thereby permitting resistor 54 to disable transistor 37. External transistor 64 is operated by a base electrode which is connected to circuitry (not shown) for controlling motor drive circuit 69.

A second leg of the H-bridge is similar to the first leg and includes N-channel transistor 39 connected in series with transistor 38. A high side switch which includes p-channel transistor 38 is used to couple motor 48 to power supply terminal 46. Consequently, the source electrode of transistor 38 is connected to power supply terminal 46, and the drain electrode connected to an output terminal 60 of circuit 69. A freewheeling diode 43 that steers energy from motor 48 to power supply terminal 46 has the anode connected to the drain electrode of transistor 38 and the cathode connected to the source electrode of transistor 38. An external transistor 65 couples a means for disabling transistor 38, illustrated as a resistor 56, to power supply terminal 46 in order to apply gate voltage to transistor 38 thereby disabling it. Resistor 56 has a first terminal connected to the gate electrode of transistor 38 and a second terminal connected to an input terminal 26 of circuit 69. In order to apply a voltage to resistor 56, the emitter electrode of external transistor 65 is connected to input terminal 26 and the collector electrode is connected to power supply terminal 46. A base electrode of external transistor 65 is connected to circuitry (not shown) for controlling motor drive circuit 69. During a portion of the operation of circuit 69, transistor 38 is enabled by a means for enabling transistor 38, illustrated as a resistor 57, and an external transistor 66. To enable transistor 38, external transistor 66 is enabled via its base electrode which is connected to circuitry (not shown) for controlling motor drive circuit 69. The collector electrode of external transistor 66 is connected to an input terminal 27 of circuit 69 and the emitter electrode is connected to a power supply terminal 47 thereby facilitating the application of a signal to input terminal 27. Since the first terminal of resistor 57 is connected to input terminal 27 and the second terminal is connected to the gate electrode of transistor 38, a signal applied to input terminal 27 is coupled to the gate of transistor 38 to enable it.

A low side switch in the second leg of the H-bridge includes transistor 39 and is operated in a manner similar to the high side switch. Since the source electrode of transistor 39 is connected to power supply terminal 47 and the drain electrode is connected to output terminal 60, enabling transistor 39 couples motor 48 to power supply terminal 47. A freewheeling diode 44 connected in parallel with transistor 39 directs energy from motor 48 to power supply terminal 47 and bypasses transistor 39. The anode of freewheeling diode 44 is connected to the source electrode of transistor 39 and the cathode is connected to the drain electrode of transistor 39. During a portion of the operation of circuit 69, an enabling gate voltage is applied to transistor 39 by a means for enabling transistor 39, illustrated as a resistor 58, and an external transistor 67. In order to develop the gate voltage, the collector electrode of external transistor 67 is connected to power supply terminal 46 and the emitter electrode is connected to an input terminal 28 of circuit 69. A base electrode of transistor 67 is connected to circuitry (not shown) for controlling motor drive circuit 69. Since resistor 58 has a first terminal connected to the gate electrode of transistor 39 and a second terminal connected to input terminal 28, voltage applied to input terminal 28 is coupled to the gate of transistor 39 to enable it. Similarly, transistor 39 is disabled by the action of a means for disabling transistor 39, illustrated as a resistor 59, and an external transistor 68. The first terminal of resistor 59 is connected to the gate electrode of transistor 39, and the second terminal is connected to an input terminal 29 of circuit 69. Since the collector electrode of external transistor 68 is connected to input terminal 29 and the emitter electrode is connected to power supply terminal 47, transistor 68 can couple resistor 59 to power supply terminal 47 thereby permitting resistor 59 to disable transistor 39. Transistor 68 is operated by a base electrode which is connected to circuitry (not shown) for controlling motor drive circuit 69.

Although transistors 36 and 38 are illustrated as P-channel power MOSFETs and transistors 37 and 39 are illustrated as N-channel power MOSFETs, other types of transistors may be used for the H-bridge of circuit 69. In the preferred embodiment, transistors 36, 37, 38, and 39 each have an integral freewheeling diode connected in parallel with each transistor. Although transistors 61, 62, 63, 64, 65, 66, 67, and 68 are illustrated as bipolar NPN transistors, other types of transistors may be substituted. Also motor 48 is illustrated as a direct current (D.C.) motor although the circuit is applicable to other types of motors.

Figure 4:
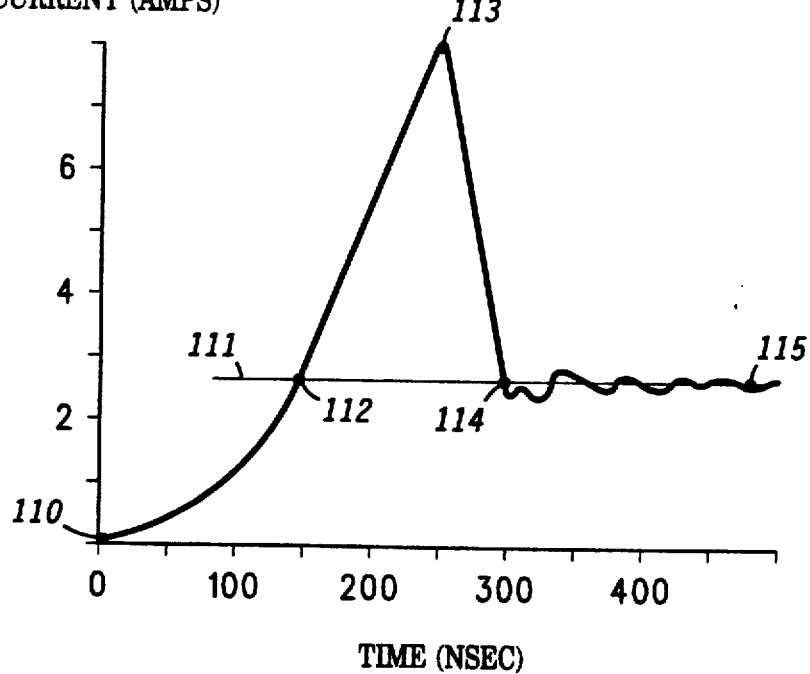
FIG. 4 is graph of power supply current during a portion of the operation of the circuit of FIG. 3 in accordance with the present invention.

FIG. 4 is a graph of current flow through power supply terminal 46 of FIG. 3 during a portion of the operation of circuit 69 shown in FIG. 3. The current in amps is shown along the ordinate and time in nanoseconds is shown along the abscissa. Current begins at a value approximately equal to zero as shown by point 110, increases to a value at point 112 that is approximately equal to the steady state current projected by line 111, increases to a peak approximately at point 113, decreases to a value at point 114 that is approximately equal to the steady state current shown by line 111, and has minor variations until the steady state current is reached approximately at point 115.

Referring once again to FIG. 3, noise induced during the pulse width modulation of a motor drive circuit can be reduced by briefly turning-on a normally disabled or non-conducting transistor that is in parallel with the noise inducing freewheeling diode. In circuit 69, if transistors 36 and 39 are conducting, transistors 37 and 38 are not conducting. To disable transistor 38, transistor 65 is enabled or turned-on coupling the gate electrode of transistor 38 to power supply terminal 46 through resistor 56 and transistor 65. If current flow through transistor 39 is disabled, the voltage at a node 50 rapidly increases until it surpasses the voltage at power supply terminal 46 thereby causing diode 43 to conduct current from motor 48 to power supply terminal 46. A parasitic capacitance 40 of transistor 38 couples the increased voltage at node 50 to the gate electrode of transistor 38. The coupled voltage increases the voltage applied to the gate electrode of transistor 38 thereby ensuring it remains disabled. As transistor 39 is once again turned on and begins to conduct current through motor 48, current from power supply terminal 46 increases and reaches the approximate value that will become the steady state current projected to point 112 by line 111 of FIG. 4. During this time, the inductive characteristics of motor 48 maintains a voltage at node 50 that exceeds the voltage of power supply terminal 46 thereby maintaining a forward bias on diode 43 which continues conducting current from motor 48 to power supply terminal 46. Once the current reaches point 112 of FIG. 4, transistor 39 is conducting all the motor current, diode 43 is no longer conducting any current from motor 48, and the voltage across diode 43 reverses from a forward voltage to approximately zero. At this point, reverse recovery current begins to flow through diode 43 to dissipate its stored charge while diode 43 functions as a short coupling the voltage value of power supply terminal 46 to node 50. The reverse recovery current of diode 43 increases current flow through terminal 46 from approximately point 112 to approximately point 113 of FIG. 4. Once the stored charge of diode 43 is eliminated, current flow from diode 43 abruptly ceases, diode 43 recovers its ability to block reverse voltage, and diode 43 releases node 50 from power supply terminal 46. Consequently, the voltage at node 50 rapidly changes from a voltage value approximately equal to that of supply terminal 46 to a voltage value approximately equal to that of power supply terminal 47. Since the voltage across parasitic capacitor 40 can't change instantaneously, the rapid voltage decrease is coupled to the gate of transistor 38 by parasitic capacitor 40, thereby providing a voltage which enables transistor 38. Once enabled, transistor 38 supplies current from power supply terminal 46 through transistor 39 to power supply terminal 47. This additional current slows the decrease of current (or the rapid change of current) that normally occurs at power supply terminal 46 as current through diode 43 ceases. Slowing the change of current by enabling transistor 38 provides a substantially critically damped waveform for the current through power supply terminal 46 during the time reverse recovery transition current is flowing in diode 43. Consequently, current flow decays slowly from point 113 of FIG. 4 to point 114 and attains the steady state current shown at point 115 without the large undershoot and overshoot shown in FIG. 2.

Briefly turning-on the normally non-conducting transistor 38 during the reverse recovery transition of diode 43 reduces the noise induced in power supply terminal 46 by diode 43. FIG. 4 illustrates that the time when reverse recovery transition current is flowing is typically short, approximately the time between points 113 and 114 or approximately 50 nsec. Even though transistor 38 is enabled for only a short time, it substantially critically damps the reverse recovery transition current of circuit 69 and reduces noise induced by circuit 69. When transistors 37 and 38 are conducting current through the other leg of the H-bridge, transistor 36 is briefly enabled while reverse recovery transition current is flowing in diode 41 and substantially critically damps the reverse recovery transition current of diode 41.

Pulse width modulation of circuit 69 requires switching its transistors at a high rate, typically in the range of 2 KHz to 100 KHz. With such a switching rate, it is important to enable and disable transistors as fast as possible without creating excess noise. Utilizing separate resistors for enabling and disabling each transistor 36, 37, 38, and 39, permits optimizing each transistor's enable and disable time for reduced noise, and also permits substantially critically damping the reverse recovery transition current of diodes 41 and 43 without effecting other switching characteristics of circuit 69. The value chosen for enabling resistors 52, and 57 should provide fast turn-on of transistors 36, and 38 without generating excess noise. Values of resistors 51 and 56 are chosen to substantially critically damp the current waveform of power supply terminal 46 as shown in FIG. 4. Disabling resistors 54 and 59 are chosen so that the slope of the waveform of the current from power supply terminal 46 when transistors 37 and 39 turn-off, approximately matches the slope of the reverse recovery transition current waveform shown in FIG. 4. Also, values for resistors 53 and 58 are chosen to provide a turn-on time for transistors 37 and 39 that is slower than their turn-off time. Using separate enable and disable resistors is important to ensuring that the reverse recovery transition current is substantially critically damped without effecting other switching characteristics of circuit 69. Consequently, the separate resistors permit optimizing circuit 69 to reduce induced noise.

Comparing the graph of FIG. 4 to the graph of FIG. 2 shows that noise generated by the circuit of FIG. 3 is greatly reduced from the noise generated by the circuit of FIG. 1. This shows that the technique of briefly enabling a normally non-conducting transistor that is in parallel with a freewheeling diode greatly reduces noise induced by the freewheeling diode. Utilizing separate resistors to enable and disable the transistor provides a mechanism that permits the disable resistor, in conjunction with a parasitic capacitor of the transistor, to briefly enable the non-conducting transistor during the time reverse recovery transition current is flowing in the freewheeling diode.

The technique can also be applied to three phase H-bridges in addition to the two phase H-bridge illustrated in FIG. 3. Similarly, the technique can also be applied to a circuit that has a single leg of the H-bridge. In such a circuit, terminal 46 and terminal 47 would be connected to two separate power supplies which have a common return, the single leg of the H-bridge would be connected to a first motor terminal, and a second motor terminal would be connected to the common return.

It is also possible to invert the operation of circuit 69 by disabling both transistors 36 and 38 while one of transistors 37 or 39 remains enabled. In such a case, the reverse recovery transition current of diodes 42 and 44 is substantially critically damped by enabling the associated transistor 37 or 39.

Figure 5:
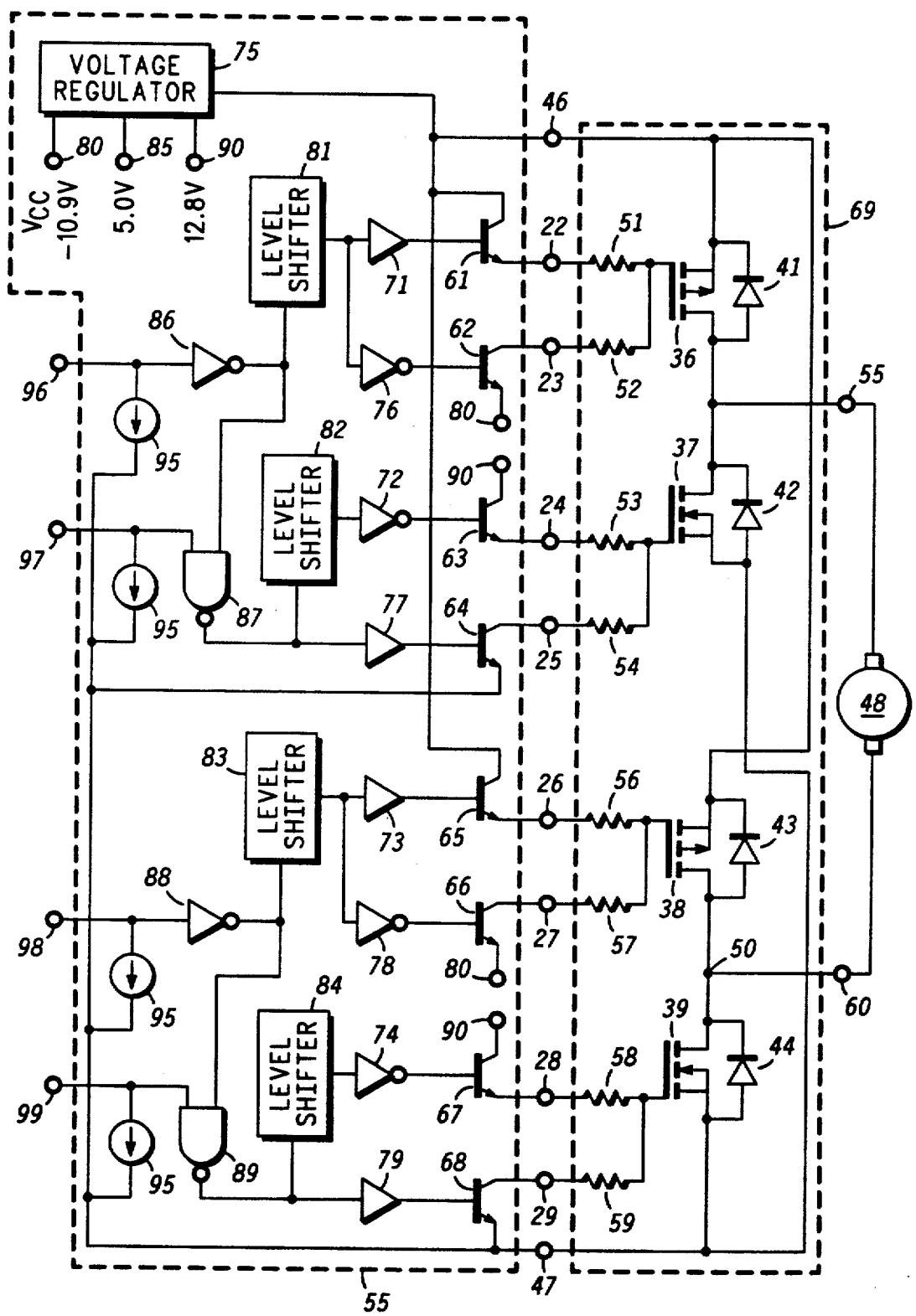
FIG. 5 is an embodiment of a circuit, suitable for integrating into a monolithic integrated circuit, for controlling the motor drive circuit of FIG. 3 in accordance with the present invention.

Referring to FIG. 5, a circuit 55 is suitable for integrating into a monolithic integrated circuit and can be utilized to control circuit 69 shown in FIG. 3. Motor drive transistors 36, 37, 38, and 39, freewheeling diodes 41, 42, 43, and 44, and resistors 51, 52, 53, 54, 56, 57, 58, and 59 are the same elements as shown in circuit 69 of FIG. 3. Transistors 61, 62, 63, 64, 65, 66, 67, and 68 shown as external transistors in FIG. 3 are included in circuit 55. The elements from circuit 69 shown in FIG. 3 are connected to motor 48, and function as described in FIG. 3. Since circuit 55 is powered from motor power supply terminal 46 which is typically at a voltage of 40 volts or higher, an internal voltage regulator 75 provides internal power supply outputs 80, 85, and 90 that are required to operate circuit 55. In circuit 55, the emitter electrode of transistors 62 and 66 is now connected to internal power supply output 80 instead of power supply terminal 47 as shown in FIG. 3, and the collector electrode of transistors 63 and 67 is now connected to internal power supply output 90 instead of power supply terminal 46 as shown in FIG. 3. Because gate to source voltages of power MOSFETs such as motor drive transistors 36, 37, 38, and 39 typically must be limited to voltage between 5 volts to 15 volts, internal power supply output 80 provides a voltage that is 10.9 volts less that the voltage applied to power supply terminal 46 (illustrated as $V_{cc}$-10.9 volts). The voltage from power supply output 80 permits the collector electrode of transistors 62 and 66 to track the voltage applied to power supply terminal 46 without damaging the gate of transistors 36 or 38. Similarly, internal power supply output 90 provides a voltage (12.8 volts) that is sufficiently high to ensure transistors 37 and 39 are turned-on by transistors 67 and 63 without damaging the gate of transistors 37 and 39. Internal power supply output 85 provides a low voltage (5.0 volts) power supply to operate logic gates and other low voltage elements of circuit 55.

Circuit 55 includes two lock-out circuits each of which prevent simultaneous enabling of both its associated high side switch and low side transistor. The first lock-out circuit includes an inverter 86 and a NAND gate 87 while the second lock-out circuit includes an inverter 88 and a NAND gate 89. Inverter 86 and NAND gate 87 of the first lock-out circuit function to prevent inadvertently enabling both transistor 36 and transistor 37 simultaneously. A high side switch enable input terminal 96 is connected to the input of inverter 86 and a low side switch enable input terminal 97 is connected to a first input of NAND gate 87. Also in the first lock-out circuit, the output of inverter 86 is connected to a second input of NAND gate 87. If input terminal 96 is enabled with a logic high, the output of NAND gate 87 prevents transistor 37 from being enabled. Inverter 88 and NAND gate 89 of the second lock-out circuit perform the same function for transistor 38 and transistor 39. A high side switch enable input terminal 98 is connected to the input of inverter 88 and a low side switch enable input terminal 99 is connected to a first input of NAND gate 89. Also in the second lock-out circuit, the output of inverter 88 is connected to a second input of NAND gate 89. If input terminal 98 is enabled with a logic high, the output of NAND gate 89 prevents transistor 39 from being enabled. Utilizing the two lock-out circuits simplifies the operation of motor 48. Using the two lock-out circuits, a pulse width modulation signal could be applied simultaneously to both enable input terminal 97 and enable input terminal 99, and the operation of motor 48 could be controlled by alternately enabling input terminal 96 and input terminal 98 thereby simplifying the control logic required to operate motor 48.

Since inverter 86 and NAND gate 87 operate from low voltage supply 85, they typically do not have output voltages suitable for operating transistors 61, 62, and 63. Consequently, the output of inverter 86 is connected to the input of a level shifter 81 which shifts the low voltage output of inverter 86 to a voltage that is suitable for operating transistors 61 and 62. Similarly, the output of NAND gate 87 is connected to the input of a level shifter 82 which shifts the low voltage output of NAND gate 87 to a voltage that is suitable for operating transistor 63. Typically, outputs of level shifters have limited current drive, therefore, the output of level shifter 81 is connected to the input of a buffer amplifier 71 which provides suitable current drive for operating transistor 61, and is also connected to the input of an inverting amplifier 76 which inverts the input signal and produces drive for the base of transistor 62. Similarly, the output of level shifter 82 is connected to the input of an inverting amplifier 72 which inverts the signal and provides suitable current drive for operating transistor 63. The output of buffer amplifier 71 is connected to the base electrode of transistor 61 (described in FIG. 3), and the output of inverting amplifier 72 is connected to the base electrode of transistor 63 (described in FIG. 3). The base electrode of transistor 62 (described in FIG. 3) is connected to the output of inverting amplifier 76. The input of a buffer amplifier 77 is connected to the output of NAND gate 87 to buffer the low voltage output of NAND gate 87 and provide a voltage that is suitable for operating transistor 64. The output of buffer amplifier 77 is connected to the base electrode of transistor 64 (described in FIG. 3).

The second lock-out circuit functions similarly to the first lock-out circuit. Inverter 88 and NAND gate 89 operate from low voltage supply 85 and require level shifters to provide a voltage suitable for operating transistors 65, 66, and 67. The output of inverter 88 is connected to the input of a level shifter 83 which provides a voltage suitable for operating transistors 65 and 66. Since the current drive of level shifter 83 is low, the output of level shifter 83 is connected to the input of a buffer amplifier 73 which provides a current drive that is suitable for operating transistor 65, and also to an input of an inverting amplifier 78 which inverts the signal from level shifter 83 and drives the base of transistor 66. The output of buffer amplifier 73 is connected to the base electrode of transistor 65 (described in FIG. 3). A level shifter 84 shifts the low voltage output of NAND gate 89 to a level suitable for operating transistor 67, therefore, the input of level shifter 84 is connected to the output of NAND gate 89. Since level shifter 84 has low drive current, the output of level shifter 84 is connected to the input of an inverting amplifier 74 which provides a current that is suitable for operating transistor 67. Consequently, the output of inverting amplifier 74 is connected to the base electrode of transistor 67 (described in FIG. 3). The output of NAND gate 89 is also connected to the input of a buffer amplifier 79 which buffers the output of NAND gate 89 to provide a voltage that is connected to the base electrode of transistor 68.

Each input terminal 96, 97, 98, and 99 of circuit 55 has a current source 95 connected from the input terminal to power supply terminal 47. Current sources 95 apply a logic zero or low voltage that disables an input if nothing is connected to the input thereby minimizing accidental enabling of circuit 55. Current sources 95 could be replaced by other circuits that perform a similar function.

Circuit 55 of FIG. 5 provides an efficient circuit suitable for integrating into a monolithic integrated circuit that can be used with the low noise motor drive circuit of FIG. 3. Circuit 55 also provides lock-out protection for a low noise motor drive circuit that is controlled by circuit 55.

By now it should be appreciated that there has been provided a novel way to provide a low noise motor drive circuit. Substantially critically damping the reverse recovery current of the freewheeling diodes reduces the noise induced when operating an electric motor. Reducing the induced noise improves the operation of circuits that are used to control the low noise motor drive circuit, and also improves the operation of other circuits that are in the proximity. The low noise motor drive circuit can be used with a variety of motors including brush motors, brushless motors, stepper motors, etc., and reduces noise induced when operating these motors.

I claim:

1. A low noise motor drive circuit which comprises:
   a first transistor having a first current carrying electrode coupled to a first power supply terminal, a second current carrying electrode coupled to a first output terminal, and a control electrode;
   a first resistor having a first terminal coupled to the control electrode of the first transistor, and a second terminal coupled to a first input terminal;
   a first diode having an anode coupled to the second current carrying electrode of the first transistor, and a cathode coupled to the first current carrying electrode of the first transistor when the first resistor facilitates enabling the first transistor when reverse recovery current is flowing in the first diode thereby reducing noise created by the first diode;
   a second transistor having a first current carrying electrode coupled to the second current carrying electrode of the first transistor, a second current carrying electrode coupled to a second power supply terminal, and a control electrode;
   a second diode having an anode coupled to the second current carrying electrode of the second transistor, and a cathode coupled to the first current carrying electrode of the second transistor;
   a second resistor having a first terminal coupled to the first terminal of the first resistor, and a second terminal coupled to a second input terminal;

a third resistor having a first terminal coupled to the control electrode of the second transistor, and a second terminal coupled to a third input terminal;

a fourth resistor having a first terminal coupled to the control electrode of the second transistor, and a second terminal coupled to a fourth input terminal;

a third transistor having a first current carrying electrode coupled to the first power supply terminal, a second current carrying electrode coupled to a second output terminal, and a control electrode;

a fifth resistor having a first terminal coupled to the control electrode of the third transistor, and a second terminal coupled to a fifth input terminal;

a third diode having an anode coupled to the second current carrying electrode of the third transistor, and a cathode coupled to the first current carrying electrode of the third transistor wherein the fifth resistor facilitates enabling the third transistor when reverse recovery current is flowing in the third diode thereby reducing noise created by the third diode;

a sixth resistor having a first terminal coupled to the first terminal of the fifth resistor, and a second terminal coupled to a sixth input terminal;

a fourth transistor having a first current carrying electrode coupled to the second output terminal, a second current carrying electrode coupled to the second power supply terminal, and a control electrode;

a fourth diode having an anode coupled to the second current carrying electrode of the fourth transistor, and a cathode coupled to the first current carrying electrode of the fourth transistor;

a seventh resistor having a first terminal coupled to the control electrode of the fourth transistor, and a second terminal coupled to a seventh input terminal; and an eighth resistor having a first terminal coupled to the control electrode of the fourth transistor, and a second terminal coupled to an eighth input terminal.

2. The low noise motor drive circuit of claim 1 wherein the first transistor and the third transistor are P-channel power metal oxide semiconductor field effect transistors (MOSFETs).

3. The low noise motor drive circuit of claim 1 wherein the second transistor and the fourth transistor are N-channel power metal oxide semiconductor field effect transistors (MOSFETs).

4. The low noise motor drive circuit of claim 1 further including a circuit for controlling the low noise motor drive circuit which comprises:

a first lock-out circuit having a first input coupled to a first enable input terminal, a second input coupled to a first disable input terminal, a first output, and a second output that is coupled to an input of a first buffer;

a first level shifter having an input coupled to the first output of the first lock-out circuit, and an output coupled to an input of a first inverting amplifier and to an input of a second buffer;

a fifth transistor having a control electrode coupled to an output of the second buffer, a first current carrying electrode coupled to the first power supply terminal, and a second current carrying electrode coupled to the first input terminal;

a sixth transistor having a control electrode coupled to an output of the first inverting amplifier, a first current carrying electrode coupled to a first internal power supply, and a second current carrying electrode coupled to the second input terminal;

a second level shifter having an input coupled to the second output of the first lock-out circuit, and an output coupled to an input of a second inverting amplifier;

a seventh transistor having a first current carrying electrode coupled to a second internal power supply, a second current carrying electrode coupled to the third input terminal, and a control electrode coupled to an output of the second inverting amplifier;

an eighth transistor having a first current carrying electrode coupled to the fourth input terminal, a second current carrying electrode coupled to the second power supply terminal, and a control electrode coupled to an output of the first buffer;

a second lock-out circuit having a first input coupled to a second enable input terminal, a second input coupled to a second disable input terminal, a first output, and a second output that is coupled to an input of a third buffer;

a third level shifter having an input coupled to the first output of the second lock-out circuit, and an output coupled to an input of a third inverting amplifier and to an input of a fourth buffer;

a ninth transistor having a control electrode coupled to an output of the fourth buffer, a first current carrying electrode coupled to the first power supply terminal, and a second current carrying electrode coupled to the fifth input terminal;

a tenth transistor having a control electrode coupled to an output of the third inverting amplifier, a first current carrying electrode coupled to the first internal power supply, and a second current carrying electrode coupled to the sixth input terminal;

a fourth level shifter having an input coupled to the second output of the second lock-out circuit, and an output coupled to an input of a fourth inverting amplifier;

an eleventh transistor having a first current carrying electrode coupled to the second internal power supply, a second current carrying electrode coupled to the seventh input terminal, and a control electrode coupled to an output of the fourth inverting amplifier; and a twelfth transistor having a first current carrying electrode coupled to the eighth input terminal, a second current carrying electrode coupled to the second power supply terminal, and a control electrode coupled to an output of the third buffer.

5. The low noise motor drive circuit of claim 4 wherein the first lock-out circuit includes an inverter having an input coupled to the first enable input terminal and an output coupled to the first output of the first lock-out circuit, and also includes a NAND gate having a first input coupled to the output of the inverter and having a second input coupled to the first disable input terminal and also having an output coupled to the second output of the first lock-out circuit.

6. The low noise motor drive circuit of claim 4 wherein the second lock-out circuit includes an inverter having an input coupled to the second enable input terminal and an output coupled to the first output of the second lock-out circuit, and also includes a NAND gate having a first input coupled to the output of the inverter and having a second input coupled to the second disable input terminal and having an output coupled to the second output of the second lock-out circuit.

7. The low noise motor drive circuit of claim 4 further including an internal voltage regulator having an input coupled to the first power supply terminal, a first output coupled to the first internal power supply, and a second output coupled to the second internal power supply.

8. A low noise motor drive circuit which comprises:
a first high side switch coupled to a first terminal of a motor;
a first low side switch coupled to the first terminal of the motor;
a first means for enabling coupled to a control electrode of the first high side switch;
a first means for disabling coupled to the control electrode of the first high side switch wherein the first means for disabling facilitates briefly enabling the first high side switch after the first low side switch is disabled in order to reduce noise created by the first high side switch;
a second means for enabling coupled to a control electrode of the first low side switch; and
a second means for disabling coupled to the control electrode of the first low side switch.

9. The low noise motor drive circuit of claim 8 wherein the first high side switch includes a transistor having a first current carrying electrode coupled to a cathode of a freewheeling diode, a second current carrying electrode coupled to the first terminal of the motor and to an anode of the freewheeling diode, and the control electrode coupled to the first means for enabling and to the first means for disabling wherein the first means for disabling can briefly enable the transistor while reverse recovery transition current is flowing in the freewheeling diode.

10. The low noise motor drive circuit of claim 8 wherein the first low side switch includes a transistor having a first current carrying electrode coupled to an anode of a freewheeling diode, a second current carrying electrode coupled to the first terminal of the motor and to a cathode of the freewheeling diode, and the control electrode coupled to the second means for enabling and to the second means for disabling wherein the second means for disabling can briefly enable the transistor while reverse recovery transition current is flowing in the freewheeling diode.

11. The low noise motor drive circuit of claim 8 further including a second terminal of the motor coupled to a common power supply terminal 12. The low noise motor drive circuit of claim 8 further including a second high side switch coupled to a second terminal of the motor, a second low side switch coupled to the second terminal of the motor, a third means for enabling coupled to a control electrode of the second high side switch, a third means for disabling coupled to the control electrode of the second high side switch, a fourth means for enabling coupled to a control electrode of the low side switch, and a fourth means for disabling coupled to the control electrode of the low side switch.

13. The low noise motor drive circuit of claim 12 wherein the second high side switch includes a transistor having a first current carrying electrode coupled to a cathode of a freewheeling diode, a second current carrying electrode coupled to the second terminal of the motor and to an anode of the freewheeling diode, and the control electrode coupled to a third means for enabling and to a third means for disabling wherein the third means for disabling can briefly enable the transistor while reverse recovery transition current is flowing in the freewheeling diode.

14. The low noise motor drive circuit of claim 12 wherein the second low side switch includes a transistor having a first current carrying electrode coupled to an anode of a freewheeling diode, a second current carrying electrode coupled to the second terminal of the motor and to a cathode of the freewheeling diode, and the control electrode coupled to a fourth means for enabling and to a fourth means for disabling.

15. The low noise motor drive circuit of claim 8 wherein the first means for enabling includes a resistor having a first terminal coupled to the control electrode of the first high side switch and a second terminal coupled to an enable input terminal.

16. The low noise motor drive circuit of claim 8 wherein the first means for disabling includes a resistor having a first terminal coupled to the control electrode of the first high side switch and a second terminal coupled to a disable input terminal.

17. The low noise motor drive circuit of claim 8 wherein the second means for enabling includes a resistor having a first terminal coupled to the control electrode of the first low side switch and a second terminal coupled to an enable input terminal.

18. The low noise motor drive circuit of claim 8 wherein the second means for disabling includes a second resistor having a first terminal coupled to the control electrode of the first low side switch and a second terminal coupled to a disable input terminal.

19. A method of reducing noise produced by a circuit that drives an electric motor which comprises:
coupling the motor to at least a high side switch transistor and a low side switch transistor;
coupling a first freewheeling diode in parallel with the high side switch transistor and a second freewheeling diode in parallel with the low side switch transistor;
enabling the high side switch transistor while reverse recovery transition current is flowing in the first freewheeling diode in order to substantially critically damp reverse recovery transition current induced by the first freewheeling diode.

20. The method of claim 19 wherein enabling the high side switch transistor includes using a parasitic capacitor between a current carrying electrode and a control electrode of the high side switch transistor for coupling to the control electrode a rapid voltage decrease at the current carrying electrode thereby enabling the high side switch transistor.

21. The method of claim 19 further including enabling the low side switch transistor while reverse recovery current is flowing in the second freewheeling diode in order to provide damping of reverse recovery transition current induced by the second freewheeling diode.

22. The method of claim 21 wherein enabling the low side switch transistor includes using a parasitic capacitor between a current carrying electrode and a control electrode of the low side switch transistor for coupling a rapid voltage decrease at the carrying electrode to the control electrode thereby briefly enabling the low side switch transistor.

23. A method of reducing noise generated by an H-bridge circuit driving an electric motor, comprising:

switching the H-bridge circuit with a pulse width modulated signal; and enabling a normally non-conducting transistor of the H-bridge at least at the time a freewheeling diode transitions from conducting reverse recovery current to blocking reverse voltages, thereby reducing noise normally caused during transition of the freewheeling diode.

24. The method of claim 23 wherein the enabling occurs at least at the time stored charge has been removed from the freewheeling diode.

* * * * *